United States Patent [19]

Poletto

[11] Patent Number: 5,449,264
[45] Date of Patent: Sep. 12, 1995

[54] APPARATUS FOR DISTRIBUTING PRODUCTS FROM A CENTRAL UNIT TO A PLURALITY OF PERIPHERAL UNITS

[75] Inventor: Luigi Poletto, Abano Terme, Italy

[73] Assignee: Prosit Sas di Poletto ing. Luigi e C., Abano Terme, Italy

[21] Appl. No.: 246,374

[22] Filed: May 18, 1994

Related U.S. Application Data

[63] Continuation of Ser. No. 972,346, Nov. 6, 1992, abandoned.

[30] Foreign Application Priority Data

Nov. 13, 1991 [IT] Italy .................. PD91A0212

[51] Int. Cl.⁶ .............................................. B65G 67/02
[52] U.S. Cl. .................................. 414/391; 104/242;
104/245; 104/300; 104/88.01; 220/23.86;
414/399; 414/609
[58] Field of Search .............. 414/390, 391, 401, 399,
414/266, 609; 104/88, 242, 245, 247, 292, 296,
300; 220/23.83, 23.86

[56] References Cited

U.S. PATENT DOCUMENTS

| | | | |
|---|---|---|---|
| 3,341,037 | 9/1967 | Guilbert, Jr. | 414/609 X |
| 3,675,583 | 7/1972 | Sobey et al. | 104/247 X |
| 3,707,125 | 12/1972 | Milenkovic et al. | 104/242 X |
| 3,796,327 | 3/1974 | Meyer et al. | 414/401 X |
| 3,908,554 | 9/1975 | Schwarzkopf | 104/245 X |
| 4,005,838 | 2/1977 | Grundy | 104/300 X |
| 4,090,452 | 5/1978 | Segar | 104/247 |
| 4,649,830 | 3/1987 | Tanaka | 104/138.1 |
| 4,690,066 | 9/1987 | Morishita et al. | 104/295 X |
| 4,966,513 | 10/1990 | Motoda | 414/399 |
| 4,975,012 | 12/1990 | Motoda | 414/609 X |
| 5,064,331 | 12/1991 | Yamaguchi et al. | 414/391 X |
| 5,205,515 | 4/1993 | Luria | 414/399 X |
| 5,222,856 | 6/1993 | Yamamoto et al. | 414/609 X |
| 5,263,805 | 11/1993 | Brizzi et al. | 414/609 X |

FOREIGN PATENT DOCUMENTS

| | | |
|---|---|---|
| 2549814 | 2/1985 | France . |
| 1813693 | 6/1970 | Germany . |
| 2045660 | 3/1972 | Germany . |
| 2162738 | 6/1973 | Germany . |

*Primary Examiner*—David A. Bucci
*Attorney, Agent, or Firm*—Guido Modiano; Albert Josif; Daniel O'Byrne

[57] ABSTRACT

Apparatus for distributing products from a central unit to a plurality of peripheral units, including at least one annular guide which connects the central unit to at least one part of the peripheral units, at least one independently motorized trolley for conveying at least one product container, the trolley being retained on the guide, and at least one device, present at each peripheral unit, for removing and conveying the container to a region for the use of the products.

10 Claims, 4 Drawing Sheets

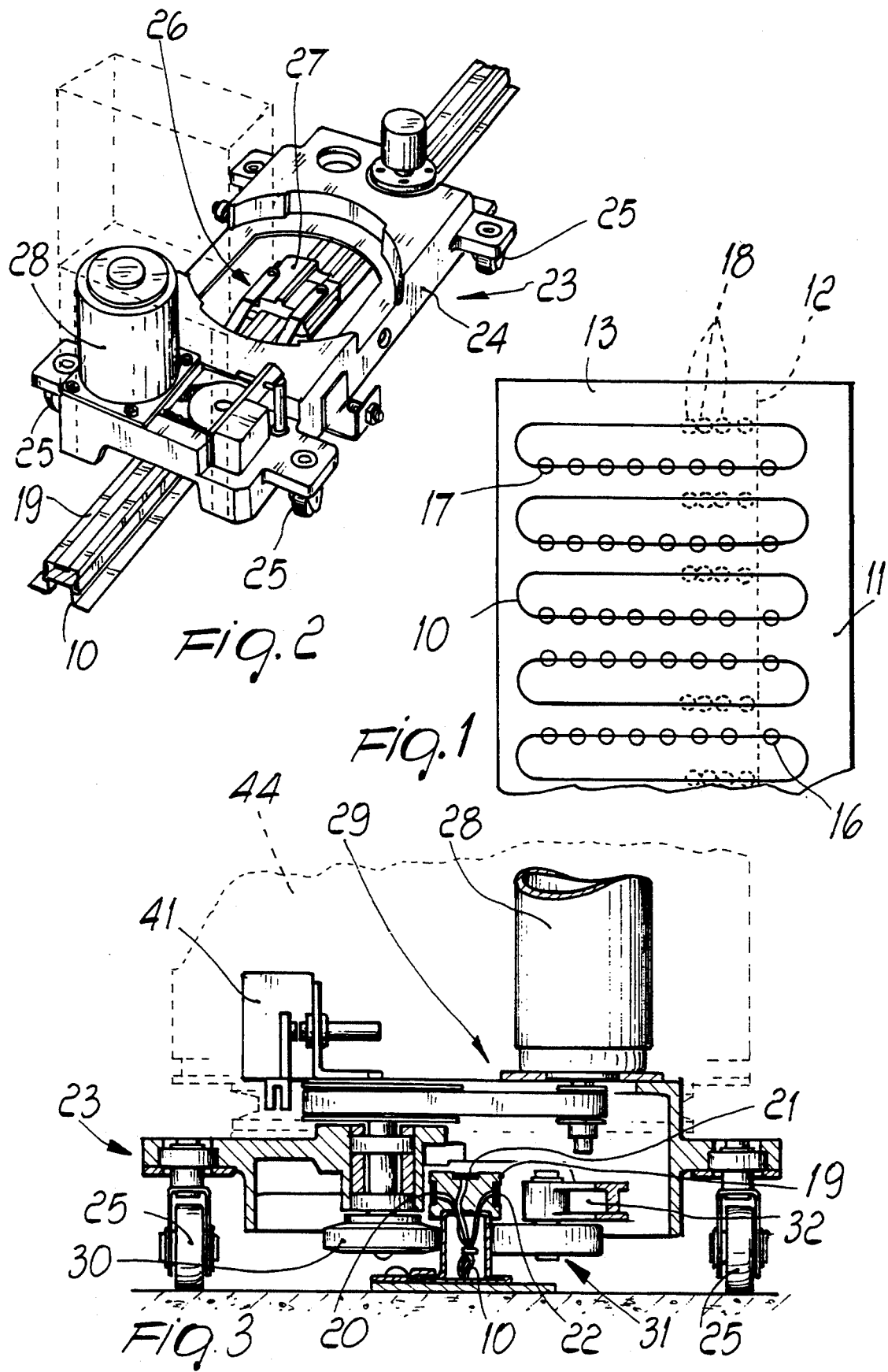

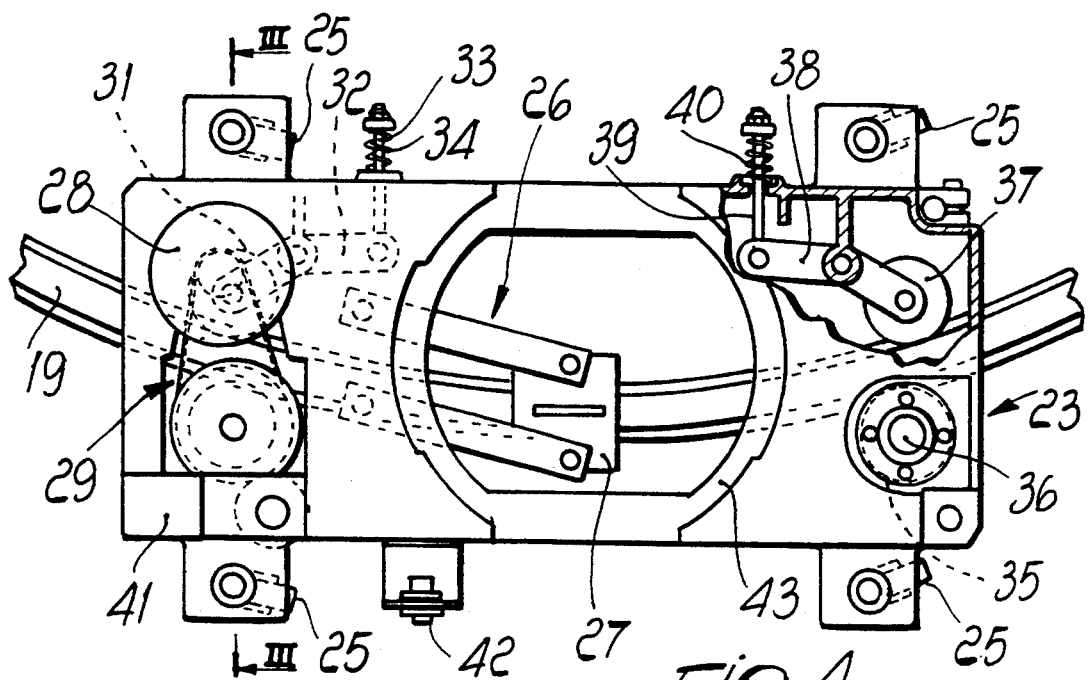
Fig. 4
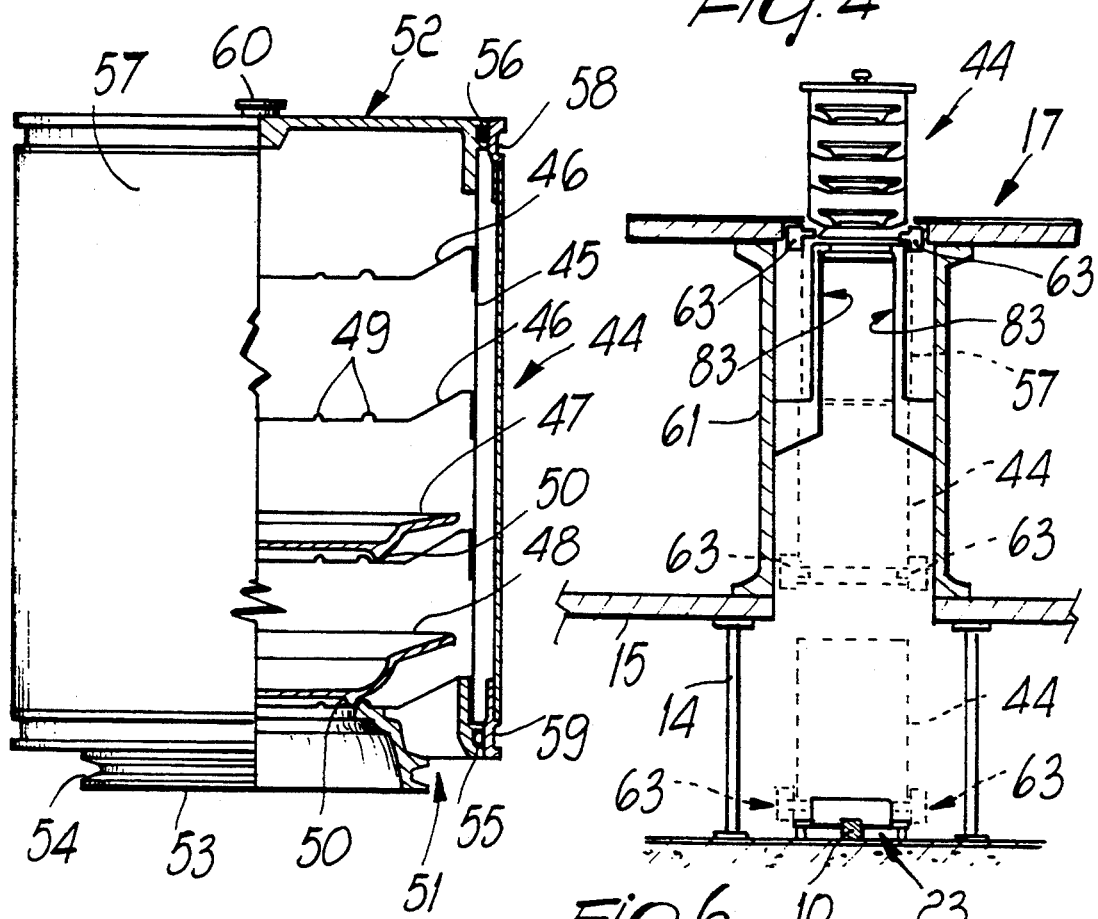
Fig. 5
Fig. 6

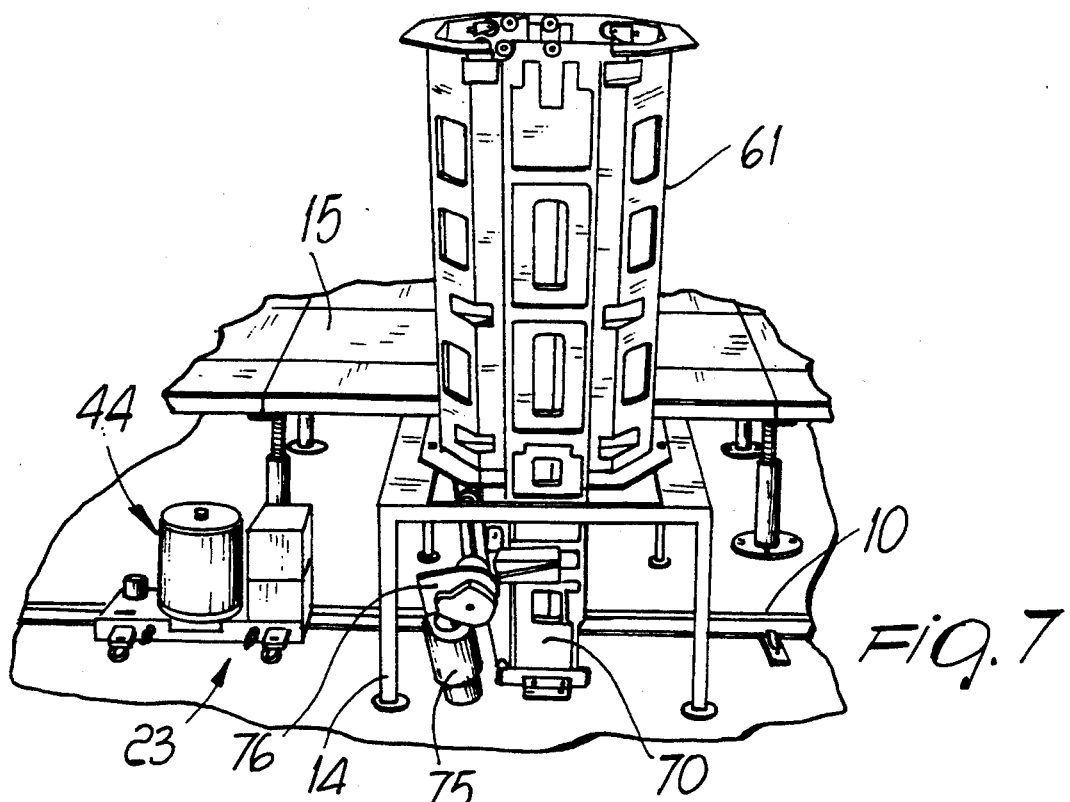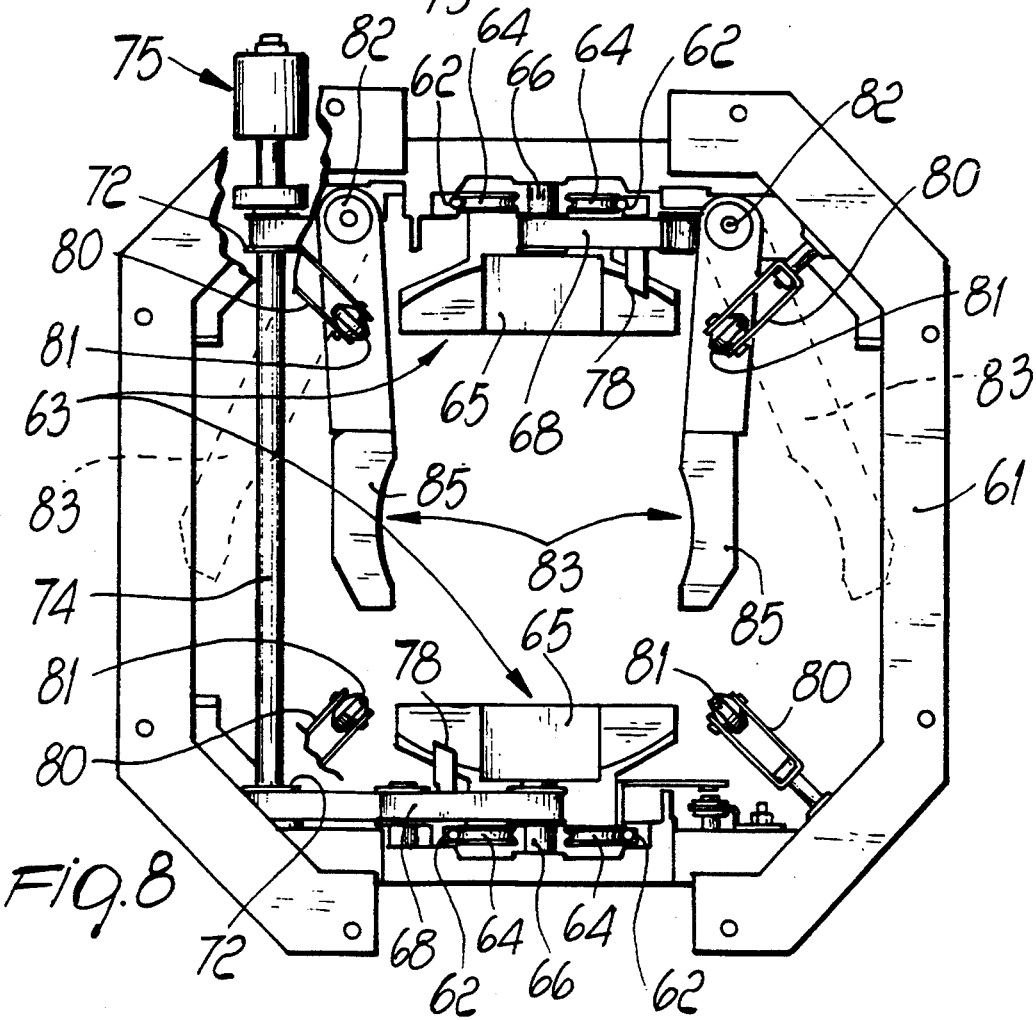

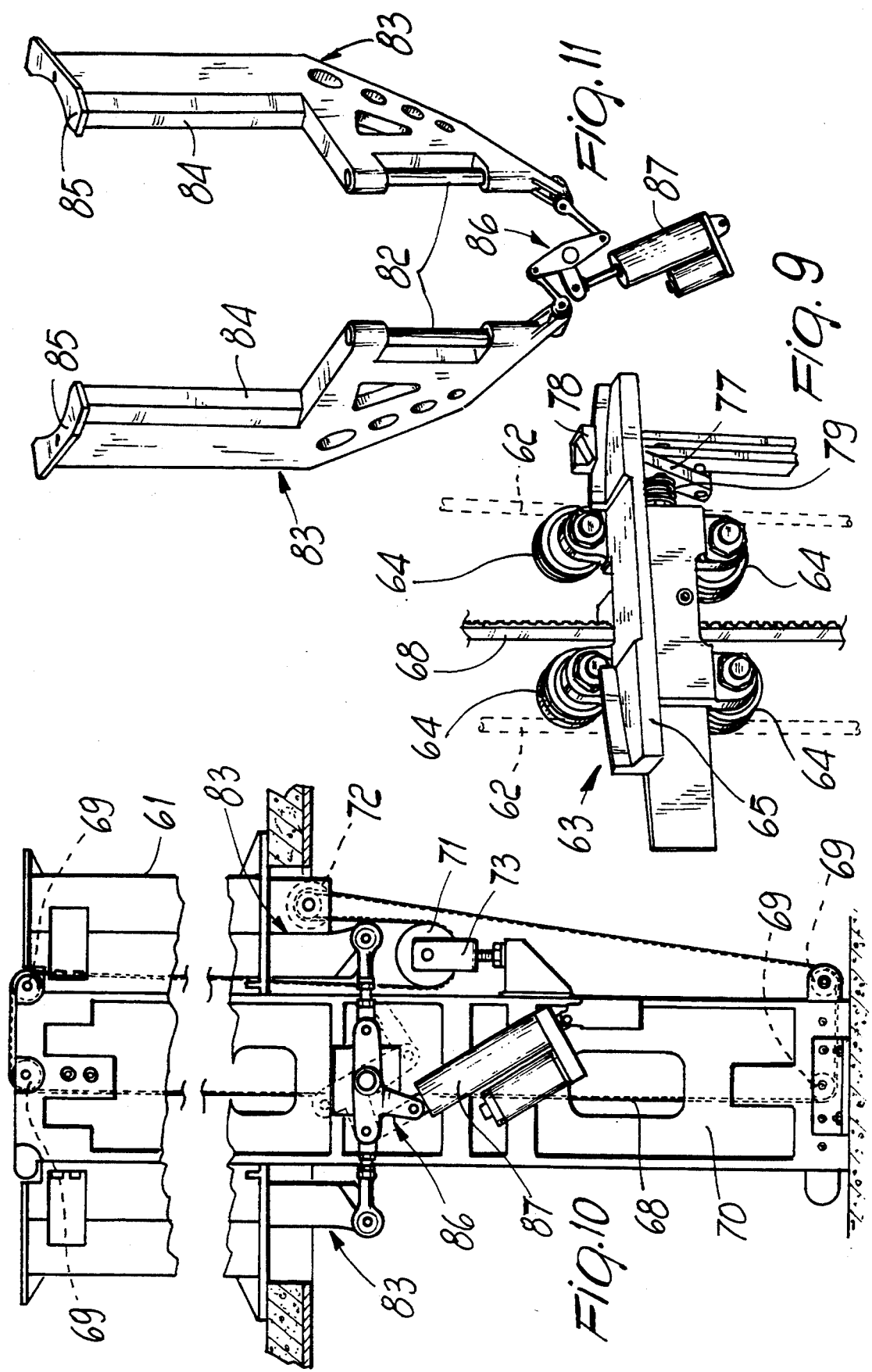

APPARATUS FOR DISTRIBUTING PRODUCTS FROM A CENTRAL UNIT TO A PLURALITY OF PERIPHERAL UNITS

This is a continuation application of application Ser. No. 07/972,346, filed on Nov. 6, 1992, now abandoned.

BACKGROUND OF THE INVENTION

The present invention relates to an apparatus for distributing products from a central unit to a plurality of peripheral units.

The apparatus can be used particularly but not exclusively for distributing orders in restaurants or similar public concerns.

It is known that in restaurants the meals are currently ordered and distributed to the various tables by means of serving staff.

Tests have been conducted which have shown that the serving staff goes to the table for orders or to carry food approximately a dozen times for a meal composed of a normal number of courses.

This naturally poses problems from the point of view of organization in the case of restaurants with a large number of tables and a considerable influx of customers.

It should also be noted that this increases idle times, i.e. waiting times, and contributes to prolong the time during which the tables remain occupied.

Considering that, on the average, the time required to eat a first course or a second course is only approximately seven minutes, it is clearly understood that it is necessary to reduce the intervention time of the staff at the table in order to reduce the time during which said table is occupied.

It should be furthermore noted that the costs related to the serving staff employed are considerable for caterers.

SUMMARY OF THE INVENTION

The aim of the present invention is to provide an apparatus for distributing products such as meals and beverages from a central unit, such as the kitchen, to a plurality of peripheral units, such as tables.

A consequent primary object is to provide an apparatus which allows to increase the speed of service at restaurant tables.

Another important object is to provide an apparatus which, if appropriately adapted, can also be used in other sectors.

Another important object is to provide an apparatus wherein the products can also be exchanged among the various peripheral units.

Another important object is to provide an apparatus comprising modular elements and which can therefore also be provided in various configurations according to the space available, the number of peripheral units, etc.

Another important object is to provide an apparatus which allows to reduce the employed staff and the costs related thereto.

Another important object is to provide an apparatus which allows to distribute courses with the highest degree of hygiene.

Not least object is to provide an apparatus which is reliable and safe, particularly as regards user safety.

This aim, these objects and others which will become apparent hereinafter are achieved by an apparatus for distributing products from a central unit to a plurality of peripheral units, characterized in that it comprises at least one annular guide which connects said central unit to at least part of said peripheral units, at least one independently motorized means for conveying at least one product containment means being retained on said at least one guide, means being present, at each one of said peripheral units, for removing and conveying said containment means to a region for the use of said products.

BRIEF DESCRIPTION OF THE DRAWINGS

Further characteristics and advantages of the invention will become apparent from the detailed description of a preferred embodiment thereof, illustrated only by way of non-limitative example in the accompanying drawings, wherein:

FIG. 1 is a schematic plan view of an apparatus for distributing, loading and unloading meals in a restaurant from a kitchen to a plurality of tables;

FIG. 2 is a perspective view of a motorized trolley suitable to convey containers with plates;

FIG. 3 is a transverse sectional view, taken in the region of the drive unit of the trolley of FIG. 2, retained on its electrified sliding guide;

FIG. 4 is a partially sectional top view of the trolley of FIGS. 2 and 3 during transit along a curve of the guide on which it is retained;

FIG. 5 is a partially sectional side view of one of the containers used to contain the plates with the meals;

FIG. 6 is a schematic sectional view of a peripheral unit, which in this case is externally configured as a table for the persons who eat but can also be configured as a table located next to the one used to eat meals;

FIG. 7 is a perspective view of the means for removing the containers with the courses and for conveying them to the eating area, related to the peripheral unit of FIG. 6;

FIG. 8 is a top view of the means of FIG. 7;

FIG. 9 is a perspective detail view of lifting means which are suitable to raise the container with the plates from a trolley to the upper part of the peripheral unit;

FIG. 10 is a lateral external view of the means for removing and conveying the containers to the meal eating area;

FIG. 11 is a perspective detail view of two retracting arms which are comprised within a peripheral unit and are suitable to keep the containers in an upward position.

DESCRIPTION OF THE PREFERRED EMBODIMENTS

With reference to the above figures, an apparatus for distributing meals, in a restaurant, from a kitchen to the tables, comprises, in a compartment located below the floor, a plurality of guides 10 shaped like an annular rail, each composed of two straight or curved portions which are blended, at their ends, by curves; each guide extends between a region 11 to the right of the broken line 12 of FIG. 1, which constitutes the kitchen, and a region 13, the restaurant room, located to the left of the broken line 12.

In the kitchen it is possible to provide for a guide shaped like an annular rail, not shown in the figures, which is arranged transversely with respect to the guides 10; said annular guide can be conveniently connected to the various lines 10 by means of switches.

A raised floor, composed of a metallic supporting frame 14 and of a series of covering panels 15, is used for this purpose.

At this point it should be stressed that the conveyance system is provided under the floor so as to not interfere in any way with traffic above the floor and to provide the best adaptation to the requirements of distribution to the various peripheral units.

In FIG. 1, the solid circles 16 in the region 11 indicate the loading stations, the solid circles 17 in the region 13 indicate the various peripheral units constituted either by tables for the customers or by tables arranged adjacent to those for the customers, and the broken-line circles 18 indicate parking and unloading areas.

Each guide 10 is fixed to the ground and is made of insulating material, with electrified tracks, respectively 20, 21 and 22, suitable to distribute mains current and to provide data transmission connections.

A plurality of independently motorized trolleys 23 is retained on each guide 10.

Each trolley 23 comprises a chassis 24 which is arranged astride the respective guide 10, which supports, in a downward position, castors 25 and which is retained on said guide 10 by means of an articulated parallelogram 26 movable on a horizontal plane and supporting a retaining element 27 which is shaped complementarily to the cross-section of said guide 10 and which is provided with electric contacts for connection to the electrified tracks.

At one end, an electric motor 28 is located on the chassis 24; said motor has a vertical axis and, by means of a toothed-belt transmission 29, drives a rubber-covered roller 30 which rests laterally on the guide 10.

A counter-roller 31 is located on the opposite side and is arranged at the end of a rocker 32 which is associated, at the other end, with a traction element 33 on which a preloaded spring 34 acts.

In practice, the spring 34 keeps the counter-roller 31 constantly pressed against the guide 10 by means of the rocker 32.

A free driven roller 35 is arranged at the opposite end of the chassis 24, is associated with an encoder 36 and cooperates with a counter-roller 37 which, like the preceding one 31, is supported by a rocker 38 with a traction element 39 and a spring 40.

An electromagnet 41 is arranged on the drive side on the chassis 24 and, by acting against a fixed abutment, not illustrated, which is located proximate to each peripheral unit, actuates the shutdown of the motor 28 and halts the trolley 23 against another fixed abutment.

There is also a sensor 42 which, by acting against a corresponding fixed abutment, not illustrated, actuates the deceleration of the motor 28 before halting.

In another embodiment, it is envisaged that the trolley can be guided by the guide in which the trolley is in a flanking position with respect to the guide instead of atop it.

In the central region, the chassis 24 is shaped so as to form a seat 43 for the resting and centering of a container 44 for conveying plates with meals.

In particular, said container 44 has a cylindrical extension and is larger in diameter than the width of the chassis 24 of the trolley 23.

Said container is constituted by two parallel shaped tubular uprights 45 between which shaped plate-like elements 46, for resting dishes of various sizes 47 and 48 for the courses, are bolted at different levels.

Conveniently, said elements 46 have raised studs 49 for the abutment and centering of the dishes 47 and 48, which are conveniently provided with complementarily shaped recesses 50.

A bottom 51 and a cover 52 are fixed respectively below and above between said uprights 45.

In particular, the bottom 51 has a lower portion 53 which has a smaller diameter than the rest of the container and is suitable to be accommodated within the seat 43 of the chassis 24, which is conveniently shaped complementarily thereto.

The portion 53 is furthermore provided with an annular groove 54 which, as will become apparent hereinafter, constitutes a grip means.

The bottom 51 and the cover 52 have, on their edges, grooves for respective sealing rings 55 and 56 against which the lower and upper ends of an outer tubular closure shell 57 rest.

This is done to isolate the inside of the container 44 and safeguard hygiene.

Said shell 57 has, above and below, outer annular grooves, respectively 58 and 59, also meant for gripping.

The container 44 is also provided, on the cover 52, with a grip knob 60.

Means for removing and conveying the containers 44 to the eating area above the floor are arranged at each peripheral unit above said guide 10.

Said removal and conveyance means comprise a tubular structure 61 whose cross-section is octagonal (or has another shape); said structure is arranged above the floor at an appropriate open region thereof which can constitute the base of a table 17 used for eating or of an auxiliary table associated therewith.

Said structure 61 is centered with respect to the guide 10 and is internally provided, in opposite positions with respect to said guide, with two pairs of vertical guides 62 having a circular cross-section and to which respective trucks 63 are retained, so that they can slide, by means of four bearings 64 each.

As can be seen in FIG. 9, said bearings 64 are arranged between the guides of each pair 62, and their outer rolling wheel is shaped complementarily so as to partially surround said guides 62.

Each truck 63 is provided with a platform 65 which is substantially shaped like a circular segment, and both platforms are mutually spaced by an extent which is slightly greater than the width of the chassis 24 of each trolley 23 and is in any case greater than the diameter of the portion 53 of the bottom 51 of each container 44.

Each truck 63 is fixed to a corresponding toothed belt 68 which is conveniently stretched between sprockets 69 which are arranged so as to define a quadrilateral between the upper part of the upright 61 and the lower part of a wing 70 extending downward from said upright, and two lateral transmission wheels, respectively 71 and 72, the first one of which is associated with a fork-shaped belt tensioner 73.

The second wheel 72 is toothed and is keyed, like the corresponding one of the other transmission, to a shaft 74 with which a gearmotor 75 is associated; said gearmotor is conveniently provided with a transmission by means of a toothed belt and is mounted on a support 76 which oscillates about the axis of said shaft 74.

Upon positioning of the trolley 23 with the container 44 supported thereon above the truck 63 (FIG. 6), actuation of the gearmotor 75 causes the ascent of the platforms 65 of the truck, which engage and support the outer portions of the bottom 51 of the container due to the previously described arrangement according to which the container 44 has a diameter larger than the width of the chassis 24 of the trolley 23 and according to which the platforms 65 are mutually spaced by an extent which is slightly greater than the width of the chassis 24, and hence the container 44 is raised. The descent of the container 44 occurs by descending the platforms.

At this point it should be stressed that each truck 63 has a lever 77 which is articulated thereto on a horizontal axis. The lever extends upwardly and laterally with respect to the platform 65 (FIG. 9). The lever has, at its end, a stop tooth 78 (FIG. 8), which is suitable to enter the groove 59 of the outer shell 57 of the container 44 for gripping the container when it is positioned on the platforms 65.

A spring 79 is coiled around the pin to which said lever 77 is articulated, thereby to tend to bias the lever and tooth 78 into a disengagement position. A cam, not shown, is arranged along the entire vertical portion of the structure 61, and when the truck 63 rises in the structure 61, the lever 77 engages against the cam to push the tooth 78 into the groove 59 of the container 44, for stability of the container as it is raised upwardly by the truck.

In an upper internal region of the structure 61 there are forks 80 which support rollers 81 having a horizontal axis and suitable to ensure the coaxial arrangement of the last portion of the ascent of the container 44 before it appears to the customers for removal of the dishes or plates.

Inside said structure 61, in a lower region to the sides of one of the pairs of guides 62, there are two shafts 82 having a vertical axis and to which corresponding arms 83 are articulated with the ends of their bases; said arms are L-shaped, and their wings 84 are slightly longer than the outer shell 57 of the container 44.

Each one of the two wings 84 is provided, in an upward position, with respective jaws 85, each one having an edge shaped complementarily to the annular groove 54 of the portion 53 of the bottom 51.

The articulation of the arms is actuated by means of a connecting-rod system 86 by means of a linear actuator 87, as shown in FIG. 11.

Articulation occurs between a position shown in broken lines in FIG. 8, in which said arms do not interfere with the ascent or descent of the container 44, and a position in which they lock the bottom 51 in position.

Advantageously, the entire apparatus is managed by a computerized system.

As regards the operation of the above described apparatus, the trolleys 23 operate unidirectionally in their own closed-loop circuit and are used to serve from the loading area 11 to the tables 17 and from said tables for return to the place of origin, passing through the parking and unloading area 18.

In the loading area 11 it is advantageously possible to provide for the presence of means for removing and conveying the containers 44 which are equivalent to those described above for removal from the trolleys 23 and conveyance to the tables.

In this case, removal and conveyance of the containers 44 to and from the trolleys occurs at the region above the floor which corresponds to the kitchen.

Each circuit preferably comprises fifteen tables served by four trolleys.

Since the conveyance of liquids is provided for, the trolleys start moving by accelerating and stop by decelerating.

Halting once the destination has been reached, at the tables, at the unloading area and at the loading area, is provided by means of reference points and with the intervention of the electromagnet 41, which is enabled by a pre-halting sensor 42 which detects the presence of a reference point located proximate to the destination, by means of path map-matching.

The operating signal enables the beginning of the deceleration gradient and the delayed energization of the electromagnet 41.

The stop position is ensured by a pair of sensors and by the encoder 36.

The travel sequences of a trolley 23 may be:
1) LAUNCH FROM THE LOADING AREA
   a) trolley 23 present;
   b) deposition of the loaded container 44;
   c) routing to the assigned table 17;
   d) arrival at the table 17;
   e) automatic removal of the container 44 at the table 17;
   f) return of the trolley 23 proximate to the unloading area 18 without the container 44, after an enabling signal from the table 17;
   g) halting of the trolley on references provided in the unloading area 18 (if there is another trolley 23 present at the unloading or loading area);
   h) if the path is free, advancement of the trolley 23 up to the loading area 16 for a new use.
2) CALL FROM THE TABLE TO RETURN EMPTIES
   a) startup of the trolley 23, which is free and parked or is already present at the loading area;
   b) arrival at the table 17;
   c) deposition of the container 44 loaded with the empties;
   d) after an enabling signal from the table 17, return of the trolley 23 to the unloading area 18;
   e) detection of the presence or absence of another trolley 23 in the unloading area 18 and halting on a preceding reference;
   f) startup of the trolley 23 toward the loading area after an unload enabling signal has been given, if the loading station is free, else wait.
3) CALL FROM THE TABLE TO RETURN AN EMPTY CONTAINER (additional request for courses)
   a) the trolley 23, which is free and parked or already present at the loading area 16, starts immediately toward the calling table 17, as in the preceding case, with the only variation that at the unloading area 18 it is observed that the container 44 is empty.
4) CALL FROM THE TABLE TO RETURN EMPTIES OF AN ADDITIONAL REQUEST
   a) the trolley 23, ready for loading, is loaded with the empty container 44 and starts to move toward the calling table 17.

From the loading area 16, the trolley 23 starts moving toward the calling table 17 only if the path is free, otherwise it places itself at the preceding table 17 or remains in standby.

As regards removal of the containers 44 from the trolleys 23 and conveyance to the eating area, when the trolley 23 and the container 44 are present at the table 17, ascent begins, by means of the gearmotor 75 which actuates the platforms 65, until the container 44 rises completely above the plane of the table 17.

In this position, a sensor enables the closure of the arms 83 whose jaws 85 grip the groove 54 of the lower portion 53 of the bottom 51 of the container 44. It should also be noted that prior to the ascent of the container 44 the stop teeth 78 have locked the outer shell 57 to the platforms 65.

At this point, the platforms 65 are made to descend carrying the outer shell 57 coupled thereto. Thus the outer shell 57, which is coupled to the platforms 65 by means of the stop teeth 78, descends together with the platforms 65. At the same time, the bottom 51 of the container 44 is gripped by the jaws 85 of the arms 83, which locks or fixes the bottom in position, as discussed previously. The fixing of the bottom 51 also fixes in place the uprights 45 and cover 52, which are connected to the bottom 51. As mentioned previously, the wings 84 of the L-shaped arms 83 (FIG. 11) are slightly longer than the outer shell 57 of the container. In this manner, as seen in FIG. 6, the wings of the arms 83 are arranged inside the outer shell 57 upon the descent thereof. It is seen that the outer shell 57 descends with respect to the fixed bottom 51 and with respect to the fixed uprights 45 and cover 52. It is also seen that the articulated arms 83 with jaws 85 and vertically guided trucks 63 with stop teeth 78 constitute means for slidably removing the outer shell 57 from the bottom 51 and cover 52 of the container 44. The descent of the outer shell 57 with respect to the bottom 51 and cover 52 exposes the inner part of the container 44, allowing to remove the plates 47 and 48.

Once removal has ended, closure and return of the container are enabled and occur by making the outer shell rise again by activating a torque control system against overloads due to external causes, activating a motion reversal microswitch (also as safety against injuries if hands are present during the closure of the shell).

Due to this reason, the gearmotor 75 can oscillate on a rocker loaded by an adjustable spring.

Once the shell has risen again, the closed empty container is made to descend again to an intermediate position, waiting to rise again to return the empty dishes or waiting for the request for an additional service besides the one already served to the table.

In this case, the container 44 waits for the presence of the trolley 23 at the table to descend completely.

In practice it has thus been observed that the above described apparatus has achieved the intended aim and objects of the present invention.

The invention thus conceived is susceptible to numerous modifications and variations, all of which are within the scope of the inventive concept.

All the details may furthermore be replaced with other technically equivalent elements.

Thus, for example, the guides 10 can be configured without electrified tracks, and power supply and data transmission can be provided for example by means of 12-V accumulators on board the trolley and a magnetic-band or optical-fiber ground cable.

In practice, the materials employed, so long as they are compatible with the contingent use, as well as the dimensions, may be any according to the requirements.

I claim:

1. An apparatus for distributing products, in particular food products, from a central zone to at least one peripheral zone, comprising:
   at least one guide element (10) extending in a path between said central zone and said peripheral zone;
   at least one trolley element (23);
   means (27) for movably supporting said trolley element on said guide element;
   at least one container element (44) for containing products;
   means (43,51,53) for removably supporting said container element on said trolley element;
   at least one central product loading station (16) for loading products on said container element, said central product loading station being positioned at a first point of said path of said guide element at said central zone;
   at least one peripheral product distribution station (17) for distributing products from said container element, said peripheral product distribution station being positioned at a second point of said path of said guide element at said peripheral zone, said second point of said path at which said peripheral product distribution station is positioned being arranged distally from said first point of said path at which said central product loading station is positioned, and thereby said central product loading station being a distinct station different than said peripheral product distribution station;
   means (28–30) for moving said trolley element on said guide element between said central product loading station and said peripheral product distribution station;
   a flooring element (15) positioned above said guide element at least at a portion thereof which comprises said second point at which said peripheral product distribution station is positioned, said flooring element having a height above said guide element such that said trolley element with said container element supported thereon can move on said guide element without interference from said flooring element;
   an opening in said flooring element positioned at said product distribution station; and
   means (63) for removing said container element from said trolley element and raising the thus removed container element through said opening and above said flooring element.

2. Apparatus according to claim 1, wherein said container element (44) comprises:
   a bottom (51) for resting on said trolley element;
   an outer shell (57) removably connected to said bottom;
   an inside which is defined internally of said outer shell when said outer shell is connected to said bottom; and
   means (45,46) for supporting products at said inside of said container element;
   and wherein the apparatus further comprises means (82-87) for removing said outer shell from said bottom of said container element when said container element has been raised above said flooring element, thereby to reveal the inside of the container element so that products supported thereat may be removed.

3. Apparatus according to claim 2, wherein said container element further comprises a cover (52) and uprights (45) interconnected between said bottom and said cover, said outer shell being cylindrical and being slidably retained about said bottom and said cover, said bottom being provided with a lower protruding portion (53) of smaller diameter and having an annular groove (54), said cylindrical outer shell being provided with an upper and lower outer annular groove (58,59), and wherein said means for removing said outer shell comprise a pair of jaws (85) clampable about said annular groove (54) of said lower protruding portion (53) to hold said bottom and cover in place, and clamping means (78) enageable on said lower outer annular groove (59) and connected to said means for removing said container element from said trolley element and raising the thus removed container element through said opening and above said flooring element.

4. Apparatus according to claim 1, wherein said path of said guide element is a closed path.

5. Apparatus according to claim 1, comprising: a plurality of said guide elements; a plurality of loading stations; a plurality of distribution stations; a plurality of said trolley elements for said plurality of guide elements; and a plurality of said container elements for said plurality of trolley elements.

6. Apparatus according to claim 1, wherein said guide element comprises electrified tracks (20–22).

7. Apparatus according to claim 1, wherein said trolley element comprises a chassis which is independently motorized by said means for moving said trolley element on said guide element which are supported on said chassis and which comprise an electric motor (28), a roller (30) in contact with said guide element, and a toothed belt transmission (29) interconnected between said electric motor and said roller.

8. Apparatus according to claim 1, wherein said means for movably supporting said trolley element on said guide element comprise an articulated parallelogram (26) with a retaining element (27) slidably connected to said guide element and two pairs of rollers (30,31 and 35,37) arranged at opposite sides of said guide element, a first one of said pair of rollers being mounted on a pivoting spring-biased rocker element (32,38).

9. Apparatus according to claim 1, wherein said trolley element comprises a chassis and wherein said means for removably supporting said container element on said trolley element comprise a seat (43) provided on said chassis.

10. Apparatus according to claim 1, wherein said trolley element comprises a chassis having a width which is narrower than the width of said container element, and wherein said means for removing said container element from said trolley element and raising the thus removed container element through said opening and above said flooring element comprise: a pair of trucks (63) with platforms (65) arranged a distance apart which is slightly larger than the width of said chassis; means (62,64) for vertically slidably supporting said trucks arranged at said opening of said flooring element; and means (68–76) for raising and lowering said trucks.

* * * * *